United States Patent
Uesugi et al.

(10) Patent No.: US 6,368,052 B2
(45) Date of Patent: Apr. 9, 2002

(54) SPINDLE DEVICE HAVING TURBINE ROTOR

(75) Inventors: Masakazu Uesugi; Shoutarou Mizobuchi, both of Yamanashi-ken (JP)

(73) Assignee: THK Co. Ltd., Tokyo (JP)

( * ) Notice: Subject to any disclaimer, the term of this patent is extended or adjusted under 35 U.S.C. 154(b) by 0 days.

(21) Appl. No.: 09/777,898

(22) Filed: Feb. 7, 2001

(30) Foreign Application Priority Data

Feb. 10, 2000 (JP) .......................................... 12-034239

(51) Int. Cl.⁷ .............................. F01D 25/16; F03B 1/00
(52) U.S. Cl. ......................................... 415/80; 415/112
(58) Field of Search .............................. 415/80, 81, 111, 415/112

(56) References Cited

U.S. PATENT DOCUMENTS

| | | | | | |
|---|---|---|---|---|---|
| 3,141,650 A | * | 7/1964 | Saffir | ........................... | 415/80 |
| 3,147,551 A | * | 9/1964 | Seegers | .................. | 415/112 X |
| 3,147,951 A | * | 9/1964 | Cain, Jr. et al. | .............. | 415/80 |
| 3,150,822 A | * | 9/1964 | Dreyfus et al. | ............. | 415/111 |
| RE25,964 E | * | 2/1966 | Williams et al. | ......... | 415/112 X |
| 3,268,205 A | * | 8/1966 | Allen et al. | .................. | 415/112 |
| 3,293,955 A | * | 12/1966 | Malmgren | .............. | 415/112 X |
| 3,471,125 A | * | 10/1969 | Taubald et al. | ............. | 415/112 |
| 3,504,987 A | * | 4/1970 | Dee | ........................ | 415/112 X |
| 3,969,042 A | * | 7/1976 | Bachler | ................... | 415/112 X |

FOREIGN PATENT DOCUMENTS

| | | | | | |
|---|---|---|---|---|---|
| DE | 2332313 | * | 5/1974 | ................. | 415/112 |
| FR | 345573 | * | 12/1904 | ................. | 415/81 |
| GB | 477449 | * | 12/1937 | ................. | 415/81 |
| GB | 1271262 | * | 4/1972 | ................. | 415/112 |
| NL | 6412040 | * | 4/1965 | ................. | 415/80 |

OTHER PUBLICATIONS

Abstract of Japanese Patent Publication No. 04–256571; dated Sep. 11, 1992.
Abstract of Japanese Patent Publication No. 08–021435; dated Jan. 23, 1996.
Abstract of Japanese Patent Publication No. 09–088957; dated Mar. 31, 1997.
Abstract of Japanese Patent Publication No. 10–096424; dated Apr. 14, 1998.
Abstract of Japanese Patent Publication No. 10–175137; dated Jun. 30, 1998.

* cited by examiner

Primary Examiner—John E. Ryznic
(74) Attorney, Agent, or Firm—Arent Fox Kintner Plotkin & Kahn PLLC

(57) ABSTRACT

A spindle device can prevent a drive fluid for a turbine rotor from being leaked to a gap between a fixed housing and a spindle which is rotatably supported on the housing as much as possible and hence, the spindle device can efficiently make use of the supplied drive fluid and can increase the rotational torque of the spindle. The spindle device rotatably drives the spindle using the turbine rotor. The rotation of the spindle to the housing is supported using a radial dynamic pressure bearing. Further, supply holes and receiving holes for the drive fluid for the turbine rotor are formed such that these holes penetrate the radial dynamic pressure bearing in the radial direction.

5 Claims, 7 Drawing Sheets

SPINDLE DEVICE HAVING TURBINE ROTOR

FIELD OF THE INVENTION AND RELATED ART STATEMENT

The present invention relates to a spindle device which rotates a spindle holding a tool such as a whetstone at a high speed, and more particularly to a spindle device which converts a fluid energy of gas or liquid into a rotating power of a spindle using a turbine rotor.

Recently as a spindle device used for a machine tool such as a grinding machine, to meet the demand for a high precision machining to work pieces, a device which is small-sized and yet has the high rotational speed of a spindle has been required. The applicant of this application has proposed a spindle device which rotatably drives a spindle using a turbine rotor and supports the rotation of the spindle by means of dynamic pressure bearings (Japanese Patent Laid-open No.175137/1998).

In such a spindle device, while the turbine rotor having turbine blades is fixedly secured to the spindle, the rotation of the spindle is supported by the dynamic pressure bearings which generate a high-pressure fluid lubrication film. When a drive fluid is blown off to the turbine blade, the spindle is rotated together with the turbine rotor. Further, since the rotation of the spindle is supported by the dynamic pressure bearings, once the rotation of the spindle is started, the spindle is held in a floating state due to the action of the fluid lubrication film so that spindle is smoothly rotated substantially without being subjected to a resistance or a vibration.

Further, in this spindle device, to facilitate the recovery of the drive fluid and to miniaturize the turbine rotor, the turbine blades mounted on the turbine rotor are constituted as centrifugal blades. As the drive fluid passes through the inside of the turbine rotor in the radial direction, a rotation is given to the turbine rotor. Accordingly, the drive fluid is blown to the center of the rotating turbine rotor from a blow-off nozzle which is fixedly secured to a housing side and when the drive fluid passes through the inside of the turbine rotor radially, a rotational drive force is generated by the turbine blades.

However, in such a conventional spindle device, when the drive fluid is blown into the center of the turbine rotor with the use of the blow-off nozzle, the drive fluid is leaked into a gap formed between the housing to which the blow-off nozzle is fixedly secured and the rotating turbine rotor so that it has been difficult to blow a whole quantity of the drive fluid supplied to the blow-off nozzle into the turbine rotor. Further, since the leaked drive fluid generates a static pressure between the housing and the turbine rotor, a force is liable to act on the spindle in the direction to enlarge the gap between the housing and the turbine rotor and hence, there has been a tendency that a leaked quantity of the drive fluid is steadily increased. Accordingly, even when a supply pressure of the drive fluid to the blow-off nozzle is increased, the increase of the rotational torque of the spindle is extremely small so that there has been a problem that it is difficult to achieve a remarkable enhancement of the efficiency of machining of work pieces. As a method for preventing such a leakage of the drive fluid, a method which provides a contact seal such as a mechanical seal between the housing and the turbine rotor is named. However, since the turbine rotor is rotated at an extremely high speed, there have been disadvantages that it gives rise to a problem with respect to the durability of the seal and the structure becomes complicated.

OBJECT AND SUMMARY OF INVENTION

The present invention has been made in view of these problems and it is an object of the present invention to provide a spindle device which can prevent the leakage of the drive fluid for a turbine rotor into a gap between a fixedly-secured housing and a spindle which is rotatably supported relative to the housing as much as possible whereby the supplied fluid liquid is efficiently utilized thus enhancing the rotational torque of the spindle.

To achieve the above mentioned object, according to the spindle device of the present invention, in a spindle device constituted such that the spindle includes a housing, a spindle which is rotatably supported on the housing and a turbine rotor which is fixedly mounted on the spindle so as to give a rotation to the spindle, and a drive fluid is blown off to the turbine rotor such that the drive fluid passes through a drive fluid passage formed along an axis of the spindle and is radially blown off toward a radial outside of the turbine rotor, a rotary sleeve which constitutes a radial dynamic pressure bearing is arranged on the spindle, a fixed sleeve of the radial dynamic pressure bearing which faces the rotary sleeve in an opposed manner by way of a given bearing gap is provided to the housing, the rotation of the spindle to the housing is supported by the radial dynamic pressure bearing, supply holes which supply the drive fluid to the drive fluid passage of the spindle from a housing side are radially formed in the fixed sleeve, and receiving holes which receive the drive fluid from the supply holes and introduce the drive fluid into the drive fluid passage are radially formed in the rotary sleeve.

In the spindle device of the present invention having such a constitution, although the spindle is rotatably driven by the turbine rotor, the drive fluid which drives the turbine rotor is first blown into the drive fluid passage of the spindle from the housing side and thereafter is blown to the turbine rotor fixedly mounted on the spindle. The drive fluid passage is formed along the axis of the spindle and the drive fluid is radially blown to the turbine rotor from the drive fluid passage to the radially outside of the turbine rotor in the radial direction. Here, the transfer of the drive fluid from the housing to the spindle which is rotated at a high speed is performed in the inside of the radial dynamic pressure bearing which supports the rotation of the spindle. That is, while the radial supply holes are formed in the fixed sleeve which constitutes the radial dynamic pressure bearing and is mounted on the housing, the radial receiving holes which receive the drive fluid from the supply holes and introduce the drive fluid into the drive fluid passage are formed in the rotary sleeve which also constitutes the radial dynamic pressure bearing and is mounted on the spindle, and the transfer of the drive fluid is performed between the supply holes and the receiving holes.

Here, the bearing gap formed between the fixed sleeve and the rotary sleeve which constitute the radial dynamic pressure bearing is several $\mu$m and hence is extremely small. Further, during the rotation of the spindle, a fluid lubrication film of a high pressure is formed in the bearing gap. Accordingly, it is possible to prevent the drive fluid blown off from the supply holes from being leaked into the gap formed between the fixed sleeve and the rotary sleeve, that is, the bearing gap of the radial dynamic pressure bearing as much as possible. Accordingly, it becomes possible to make an approximately whole quantity of the drive fluid blown off from the supply holes flow into the receiving holes of the rotary sleeve. In other words, the radial dynamic pressure bearing performs a function of a seal to prevent the leakage of the drive fluid. Accordingly, at the time of blowing the drive fluid for the turbine rotor into the drive fluid passage of the spindle from the housing, the leakage of the drive fluid can be prevented as much as possible so that the rotational torque generated by the turbine rotor is increased by an amount corresponding to the leakage prevented drive fluid.

In such a technical means, the bearing gap of the radial dynamic pressure bearing is extremely small and hence, a quantity of the drive fluid which flows into the bearing gap without flowing into the receiving holes of the rotary sleeve is extremely small. However, the drive fluid blown off from the supply holes is pressurized, when the pressurizing force is high, there is a possibility that the drive fluid flows into the gap between the fixed sleeve and the rotary sleeve. Accordingly, from this point of view, it is preferable to constitute the spindle device such that a pair of pressure generating grooves are formed in an outer peripheral surface of the rotary sleeve or an inner peripheral surface of the fixed sleeve in such a manner that the pressure generating grooves sandwich the receiving holes and the supply holes so as to generate fluid lubrication films of a high pressure in the bearing gaps of the radial dynamic pressure bearings at both sides of the supply holes and the receiving holes. Due to such a constitution, the fluid lubrication films of a high pressure are formed at both sides of the supply holes and the receiving holes so that it becomes possible to positively prevent the drive fluid blown off from the supply holes from flowing into the bearing gaps of the radial dynamic pressure bearings whereby it becomes possible to prevent the loss of the drive fluid transferred from the supply holes to the receiving holes as much as possible.

Further, since the spindle is rotated, depending on the rotational position of the spindle, there may be a case that the communication between the supply holes formed in the fixed sleeve and the receiving holes formed in the rotary sleeve is interrupted. When the supply of the drive fluid to the turbine rotor is interrupted due to such an interruption of communication, the rotational torque of the spindle is remarkably fluctuated. Accordingly, from this point of view, it is preferable to respectively form a plurality of supply holes or receiving holes in the circumferential direction of the fixed sleeve or the rotary sleeve such that any one of the supply holes and any one of the receiving holes are always communicated with each other irrespective of the rotational position of the spindle. Due to such a constitution, the supply of the drive fluid to the turbine rotor is not interrupted and hence, it becomes possible to prevent the fluctuation of the rotational torque given to the spindle as much as possible.

Further, in the spindle device of the present invention, the drive fluid for the turbine rotor is blown off to the spindle such that the drive fluid passes through the radial dynamic pressure bearing in the radial direction and hence, it may be possible to use the lubrication fluid supplied into the bearing gap of the radial dynamic pressure bearing in common with the drive fluid. However, in case the drive fluid and the lubrication fluid are used in common, when the supply of the drive fluid is stopped for stopping the rotation of the spindle, the supply of the lubrication fluid to the radial dynamic pressure bearing is also stopped. In this case, since the bearing gap of the radial dynamic pressure bearing receives the remarkable negative pressure, there is a possibility that the fixed sleeve and the rotary sleeve are adhered to each other thus giving rise to a solid contact. Accordingly, from this point of view, it is preferable to constitute the spindle device such that a supply passage of the lubrication fluid to the bearing gaps is formed independently or separately from a supply passage of the drive fluid for the turbine rotor such that even at the time of stopping the supply of the drive fluid, the lubrication fluid is supplied to the bearing gaps of the radial dynamic pressure bearing.

Still further, a liquid such as water, a coolant liquid or the like can be used as the drive fluid and the lubrication fluid in addition to a gas such as air or the like.

DETAILED DESCRIPTION OF THE PREFERRED EMBODIMENT

The present invention is explained in detail in conjunction with attached drawings hereinafter.

Figure 1:
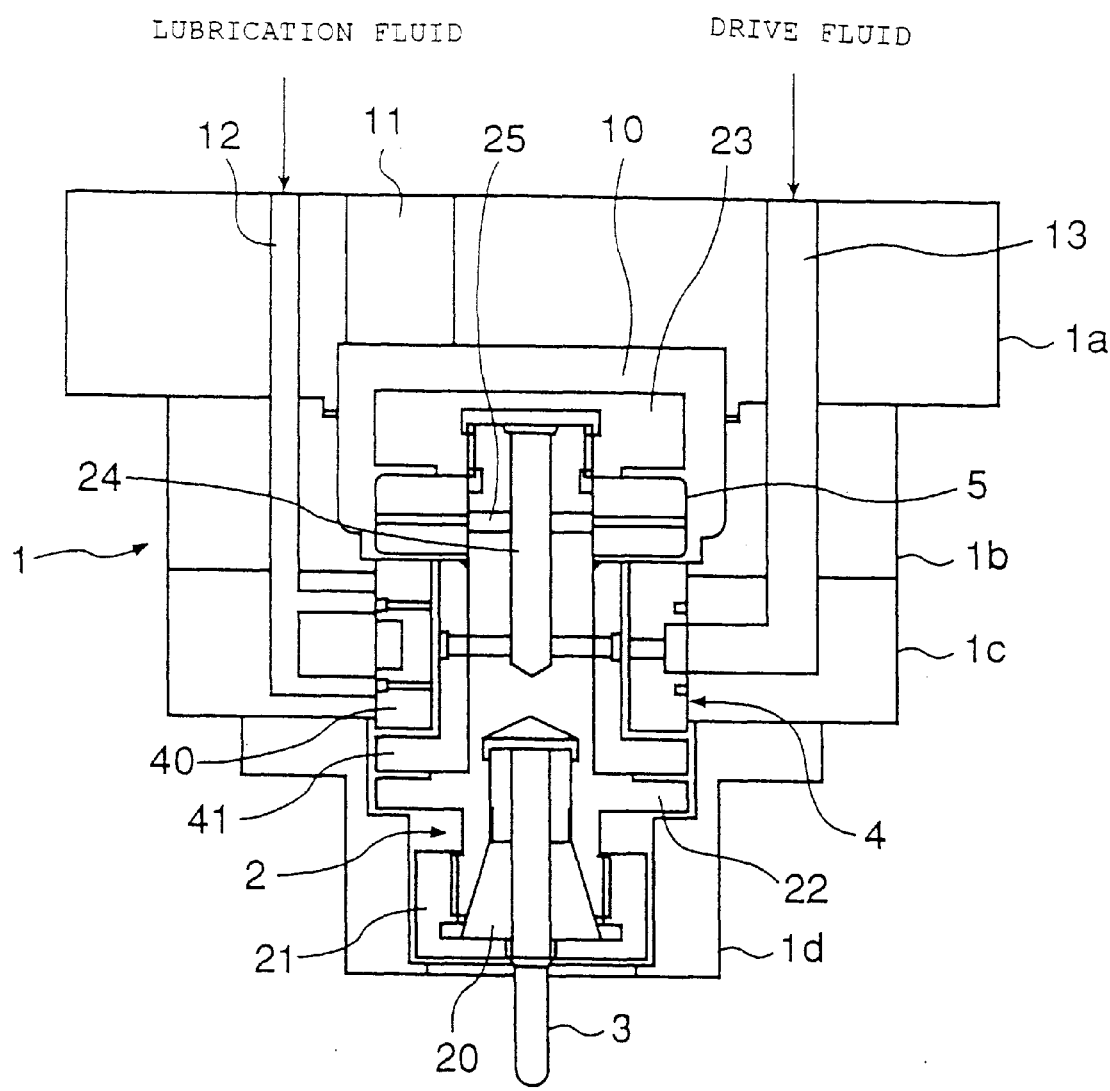
FIG. 1 is a cross-sectional view showing a spindle device of a first embodiment of the present invention.

FIG. 1 shows the first embodiment in which the present invention is applied to a spindle device which constitutes a spindle head of a milling machine or the like. This spindle device is constituted by a housing 1 fixedly secured to a spindle head of a machine tool, a spindle 2 which is rotated while gripping tool 3, dynamic pressure bearing means 4 for rotatably supporting this spindle 2 on the housing 1, and a turbine rotor 5 which rotatably drives the spindle 2 along with the blowing of a pressurized drive fluid.

Figure 2:
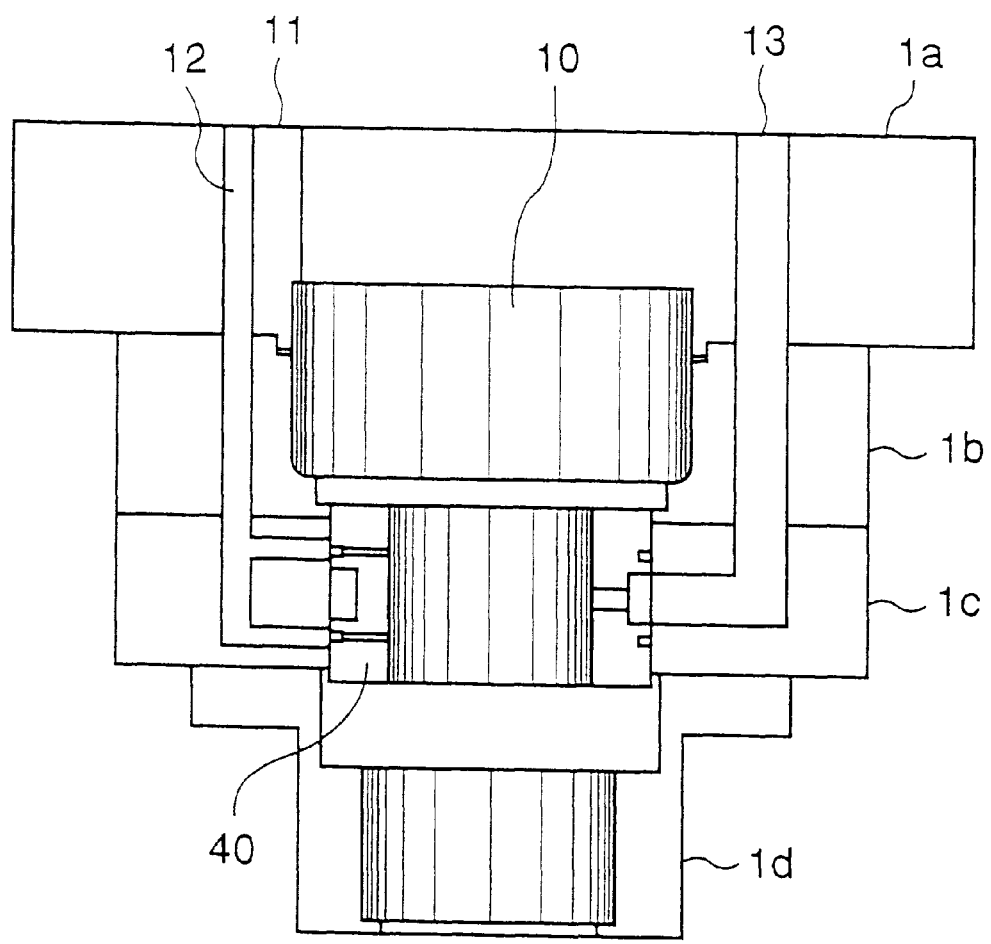
FIG. 2 is a cross-sectional view of a fixed-side member according to the first embodiment.

FIG. 2 is a view which depicts only the fixed members such as the housing 1 and the like in the spindle device by omitting the spindle 2 and members which are rotated together with the spindle 2. As shown in this drawing, the housing 1 is constituted by a base portion 1a fixedly-secured to a machine device, a turbine case 1b which defines an accommodating chamber 10 of the turbine rotor 5 together with the base portions 1a, a bearing case 1c which is fixedly secured to the turbine case 1b and retains a fixed sleeve 40 of dynamic pressure bearing means 4 which will be explained later, and a cover body 1d which is fixedly-secured to the bearing case 1c and covers a distal end of the spindle 2. The housing 1 is formed into an approximately cylindrical shape by combining these members with each other. In the drawing, numeral 11 indicates an exhaust port which discharges a used drive fluid to the outside of the housing 1 from the rotor accommodating chamber 10.

Figure 3:
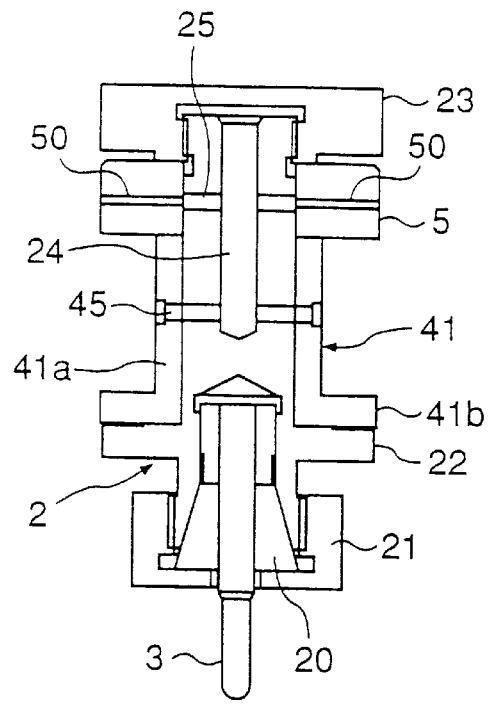
FIG. 3 is a cross-sectional view showing a rotary-side member according to the first embodiment.

On the other hand, FIG. 3 is a view which depicts only the spindle 2 and members which are rotated together with the spindle 2 by omitting fixedly-secured members such as the housing 1 and the like. A collet chuck 20 is mounted on the distal end of the spindle 2. By fastening the stopper screw 21 in a thread-engagement to a distal end of the spindle 2, a tool 3 is fixedly secured such that the tool 3 is gripped by the collet chuck 20. A rotary sleeve 41 which constitutes the dynamic pressure bearing means 4 is fixedly mounted on a dram portion of the spindle 2 and the turbine rotor 5 is fixedly secured to the spindle 2 close to the rotary sleeve 41. A flange portion 22 is formed on the spindle 2 in a protruding manner. The rotary sleeve 41 and the turbine rotor 5 are fixedly secured to the spindle 2 using this flange portion 22 as a reference. That is, after allowing the spindle 2 to pass through the rotary sleeve 41 and the turbine rotor 5 formed in a cylindrical shape from a rear end of the spindle 2, an end cap 23 is fastened to the rear end of the spindle 2 in a thread-engagement so that the rotary sleeve 41 and the turbine rotor 5 are fixedly secured to the spindle 2 in such a manner that the rotary sleeve 41 and the turbine rotor 5 are sandwiched by the flange portion 22 and the end cap 23.

Figure 4:
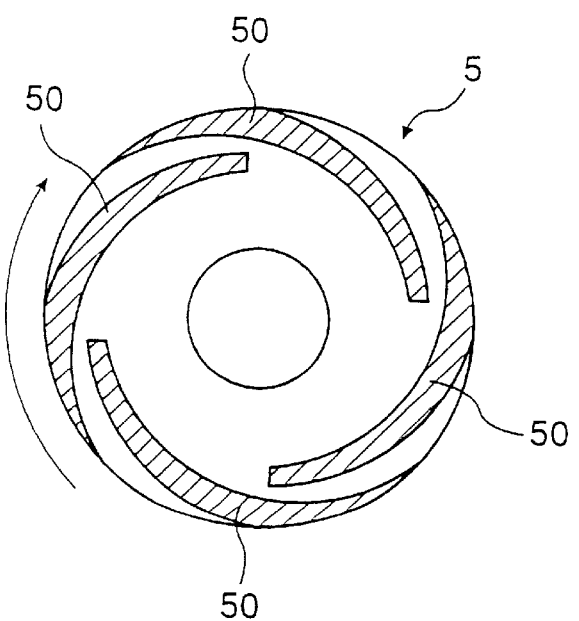
FIG. 4 is a cross-sectional view showing turbine blades formed on a turbine rotor according to the first embodiment.

Further, the turbine rotor 5 is a cylindrical member and as shown in FIG. 4, at a position provided by dividing the turbine rotor 5 in two in the axial direction, a plurality of turbine blades 50 which are formed in a spiral shape as centrifugal blades are provided. Accordingly, when the pressurized drive fluid is blown to these turbine blades 50 from the inside in the radial direction in the drawing, the turbine rotor 5 is rotated in an arrow direction due to the action of the turbine blades 50 whereby the rotation is given to the spindle 2. Here, the supply of drive fluid to the turbine rotor 5 is performed through the spindle 2. As shown in FIG. 1 and FIG. 3, a drive fluid passage 24 is formed in an axial direction on the axis of the spindle 2. The drive fluid is supplied to the turbine rotor 5 through blow-off holes 25 extending in the radial direction from this drive fluid passage 24. A supply passage for supplying the drive fluid to the drive fluid passage 24 will be explained in detail later.

Figure 5:
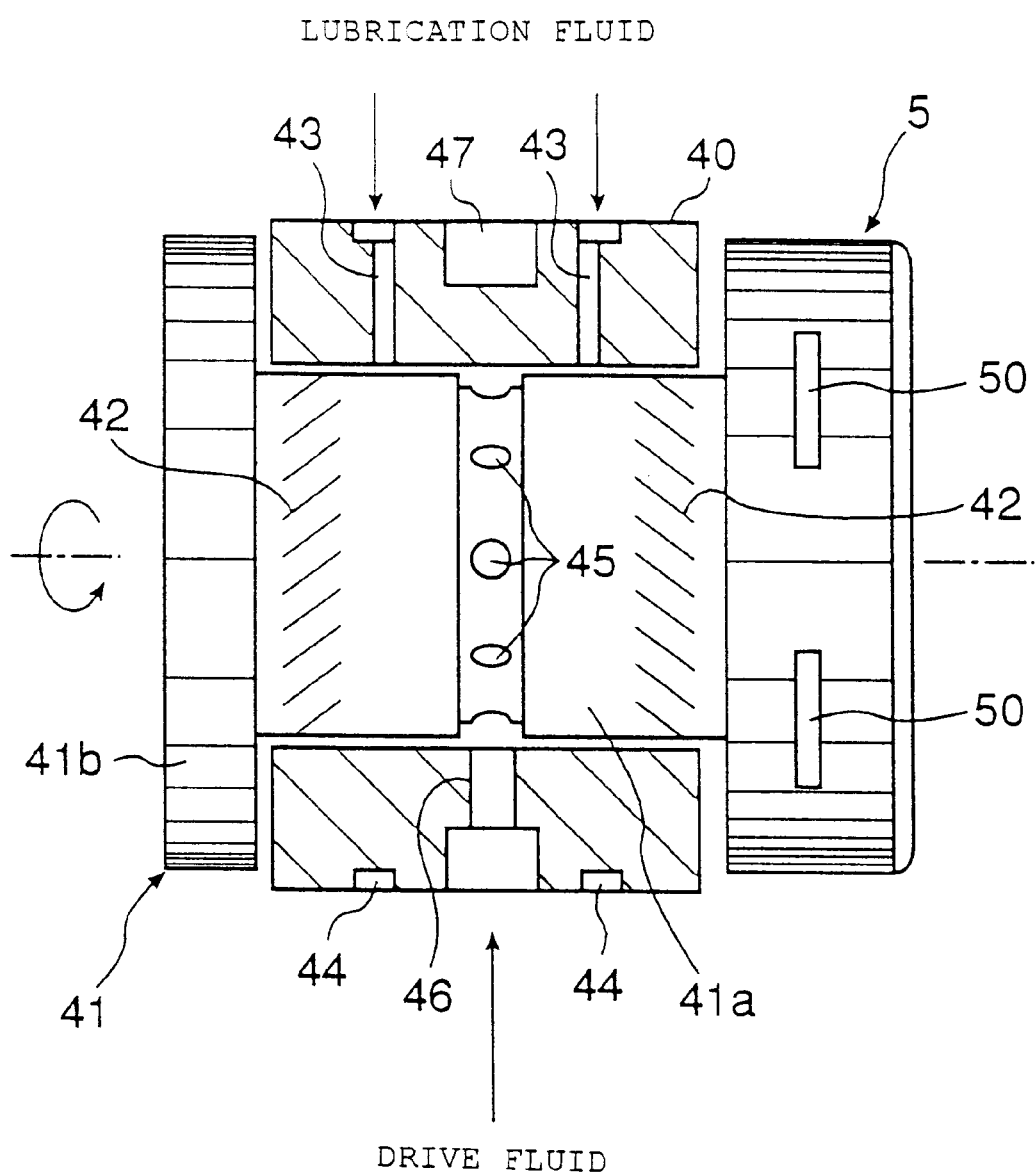
FIG. 5 is an enlarged cross-sectional view showing the relationship among a fixed sleeve, a rotary sleeve, and the turbine rotor according to the first embodiment.

Further, dynamic pressure bearing means 4 is constituted by a cylindrical fixed sleeve 40 which is fixedly secured to the bearing case 1c of the housing 1 by a shrink fitting or an adhesion or the like and a rotary sleeve 41 which is fixedly mounted on the spindle shaft 2. The latter rotary sleeve 41 is constituted by a cylindrical journal portion 41a which faces an inner peripheral surface of the fixed sleeve 40 in an opposed manner by way of a given bearing gap or interstice (for example, 5 $\mu$m) and a flange portion 41b extending outwardly in a radial direction from one end of this journal portion 41a. A radial dynamic pressure bearing is constituted by a cooperative operation of the journal portion 41a and the fixed sleeve 40. FIG. 5 is a view showing the relationship between the fixed sleeve 40 and rotary sleeve 41. Dynamic pressure generating grooves 42 in a herring bone shape are formed in portions in the vicinity of both ends of an outer peripheral surface of the journal portion 41a in the axial direction. When the rotary sleeve 41 is rotated along with the spindle 2, a fluid lubrication film of a high pressure is formed in the gap defined between the journal portion 41a of the rotary sleeve 41 and the fixed sleeve 40, that is, in the bearing gap of a radial dynamic pressure bearing so that the rotary sleeve 41 is rotatably supported by the fixed sleeve 40 in a non-contact state.

Further, the flange portion 41b of the rotary sleeve 41 embraces fixed sleeve 40 together with the turbine rotor 5, wherein the flange portion 41b and the fixed sleeve 40 constitute a thrust dynamic pressure bearing in a cooperative manner while the turbine rotor 5 and the fixed sleeve 40 also constitute a thrust dynamic pressure bearing in a cooperative manner. Given bearing gaps (for example, 9 $\mu$m) are respectively formed between the flange portion 41b of the rotary sleeve 41 and the fixed sleeve 40 and between the turbine rotor 5 and the fixed sleeve 40. Dynamic pressure generating grooves in a spiral shape (not shown in the drawings) are respectively formed on a side surface of the flange portion 41b which faces the fixed sleeve 40 in an opposed manner and an axial end surface of the turbine rotor 5. These dynamic pressure generating grooves in a spiral shape are formed in a so-called pump-out type which discharges a lubrication fluid in the inside of bearing gaps from the inner diameter side to the outer diameter side along with the rotation of the rotary sleeve 41. Accordingly, when the rotary sleeve 41 and the turbine rotor 5 are rotated along with the spindle 2, the fluid lubrication film of a high pressure is formed in the bearing gaps of respective thrust dynamic pressure bearings so that the axial movement of the spindle 2 relative to the fixed sleeve 40 is restricted. Since the dynamic pressure generating grooves in a spiral shape formed in the flange portion 41b and the dynamic pressure generating grooves in a spiral shape formed in the turbine rotor 5 face each other, they are formed in the state that they are twisted in opposite directions from each other. In the spindle device of this embodiment, the lubrication fluid supplied to the bearing gaps of the radial dynamic pressure bearing and the thrust dynamic pressure bearings is air. The lubrication fluid is sucked into the bearing gaps of the radial dynamic pressure bearings from intake holes 43 formed in the fixed sleeve 40 and flows from such bearing gaps to the bearing gaps of the thrust dynamic pressure bearings. The intake holes 43 are formed in a plural portions with respect to the fixed sleeve 40 in the radial direction and respective intake ports 43 are communicated with annular grooves 44 formed on an outer peripheral surface of the fixed sleeve 40. Further, these intake holes 43 respectively correspond to a pair of dynamic pressure generating grooves 42, 42 formed in the journal portions 41a of the rotary sleeve 41 and are arranged at two positions which are spaced apart in an axial direction. As shown in FIG. 1 and FIG. 2, an intake passage 12 for supplying the lubrication fluid is formed in the housing 1 and this intake passage 12 is communicated with annular grooves 44 of the fixed sleeve 40 which have been previously mentioned. Accordingly, the intake passage 12 is communicated with the bearing gap of the radial dynamic pressure bearing by way of the annular grooves 44 and the intake holes 43 formed in the fixed sleeve 40. When the rotation of the spindle 2 is started, air outside the housing 1 is sucked into the bearing gaps of the radial dynamic pressure bearing and the thrust dynamic pressure bearing and the fluid lubrication films of a high pressure are formed in these bearing gaps.

In the dynamic pressure bearing, since the fluid lubrication film of a high pressure is formed in the bearing gaps along with the rotation of the spindle and the rotation of the spindle is supported by these fluid lubrication films, at the time of starting the rotation of the spindle 2, the rotary sleeve 41 and the turbine rotor 5 are liable to come into solid contact with the fixed sleeve 40 and hence, when the spindle 2 is rotated by suddenly supplying the drive fluid to the turbine rotor 5, there is a possibility that the rotary sleeve 41 and the fixed sleeve 40 are damaged. Accordingly, the spindle device of this embodiment is constituted such that the pressurized air (lubrication fluid) is supplied to the above-mentioned intake passage 12 before the supply of the drive fluid into the turbine rotor 5 is started. When the pressurized air is supplied into the bearing gaps of the radial dynamic pressure bearing and the thrust dynamic pressure bearing in this manner, the static pressure of the lubrication fluid acts on the bearing gaps of respective dynamic pressure bearings so that the contact between the fixed sleeve 40 and the rotary sleeve 41 or the contact between the fixed sleeve 40 and the turbine rotor 5 can be prevented as much as possible. Further, since the dynamic pressure generating grooves in a spiral shape in the thrust dynamic pressure bearing are formed of a so-called pump-out type, when the pressurized air is supplied into the bearing gap of the thrust dynamic pressure bearing, the rotation is given to the spindle 2 due to the flow of such air and hence, prior to the supply of the drive fluid to the turbine rotor 5, the rotation at a low speed can be given to the spindle 2. Accordingly, the dynamic pressure of the lubrication fluid is also generated in the bearing gaps of respective dynamic pressure bearings so that the occurrence of the solid contact at the time of starting the rotation of the spindle 2 can be effectively obviated.

Figure 6:
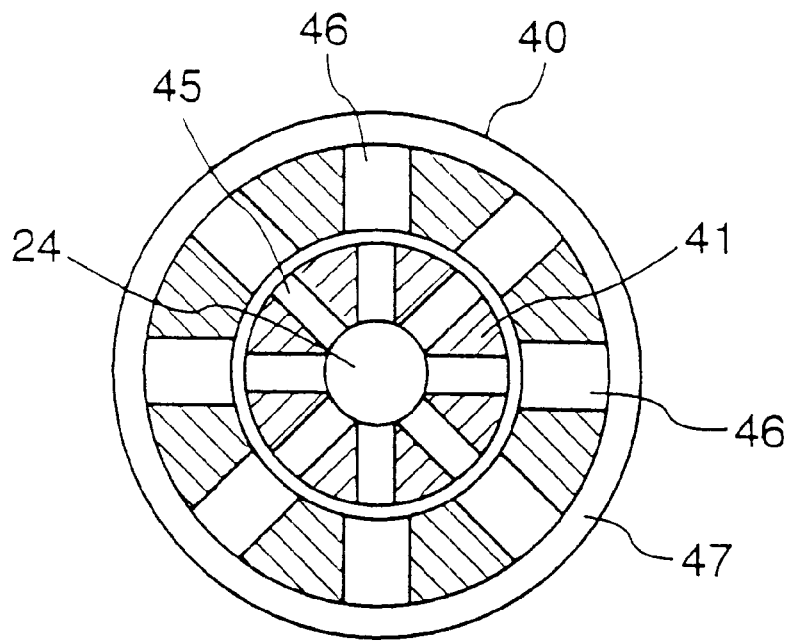
FIG. 6(a) is cross-sectional views showing a positional relationship between supply holes formed in the fixed sleeve and receiving holes formed in the rotary sleeve according to the first embodiment.
FIG. 6(b) are cross-sectional views showing a positional relationship between supply holes formed in the fixed sleeve and receiving holes formed in the rotary sleeve according to the another embodiment.
Figure 6:
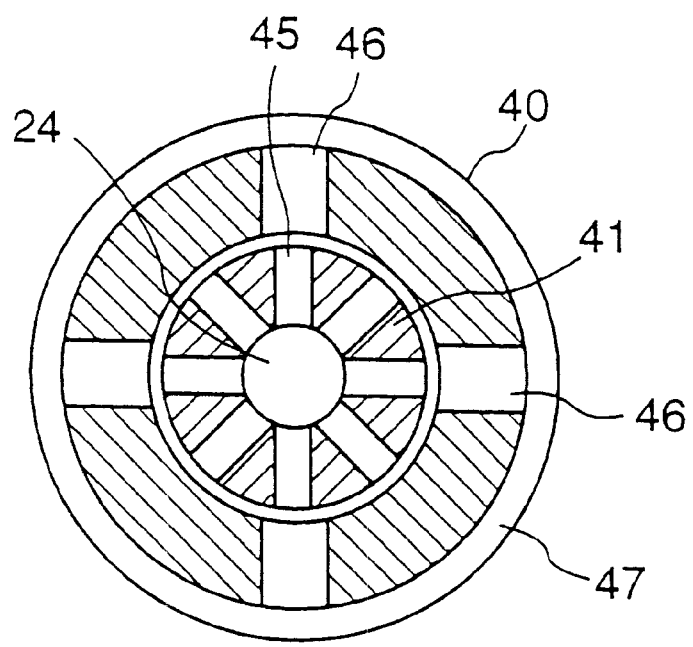

On the other hand, as shown in FIG. 5 and FIG. 6, in the journal portion 41a of the rotary sleeve 41 which is fixedly mounted on the spindle 2, a plurality of receiving holes 45 which are communicated with the drive fluid passage 24 of the spindle 2 are formed radially. These receiving holes 45 are formed at a position where the journal portion 41a is divided in two in the longitudinal direction, that is, at a position where the axial length of the radial dynamic pressure bearing is divided in two. Further, at a position which divides the fixed sleeve 40 in two in the longitudinal direction, a plurality of supply holes 46 for the drive fluid which face the receiving holes 45 of the rotary sleeve 41 in an opposed manner are formed radially and an annular groove 47 which is communicated with the supply holes 46 is formed in an outer peripheral surface of the fixed sleeve 40 (see FIG. 5). As shown in FIG. 1 and FIG. 2, a supply passage 13 for supplying the pressurized drive fluid is formed in the housing 1 and this supply passage 13 is communicated with the annular groove 47 of the fixed sleeve 40. Accordingly, such a supply passage 13 is communicated with the drive fluid passage 24 of the spindle 2 by way of the annular groove 47, the supply holes 46 formed in the fixed sleeve 40 and the receiving holes 45 formed in the rotary sleeve 41. Due to such a constitution, the drive fluid which is fed under pressure to the supply holes 46 of the fixed sleeve 40 from the supply passage 13 of the housing 1 is fed to the drive fluid passage 24 of the spindle 2 by way of the receiving holes 45 of the rotary sleeve 41 and finally is made to blown to the turbine blades 50 of the turbine rotor 5 from the drive fluid passage 24. Since the end cap 23 is fastened to the rear end of the spindle 2 in a thread-engagement, an open end of the drive fluid passage 24 which is formed on the axis of the spindle 2 is closed by the end cap 23 so that a whole quantity of the drive fluid fed into the drive fluid passage 24 from the receiving holes 45 of the rotary sleeve 41 is used for driving the turbine rotor 5.

Here, the rotary sleeve 41 in which the receiving holes 45 are formed is rotated relative to the fixed sleeve 40 in which the supply holes 46 are formed. Accordingly, during the rotation of the spindle 2, the relative position of the receiving holes 45 to the supply holes 46 is changed every second. In this case, depending on hole-forming positions or the dimensions of the supply holes 46 and the receiving holes 45, there arises a case in which the receiving holes 45 take the closed state relative to all of the supply holes 46 so that the drive fluid is not supplied to the turbine rotor 5. Since the spindle 2 is rotated at a high speed, although the interruption time of the drive fluid to the turbine rotor 5 is extremely short, when the drive fluid is interrupted in this manner, the fluctuation is generated with respect to the rotational torque of the spindle 2 so that the irregular rotation of the tool 3 fixedly secured to the spindle 2 is brought about and this eventually ill-affects the machining accuracy of work pieces to be machined by the tool 3.

From this point of view, to prevent the supply of the drive fluid to the turbine rotor 5 from being interrupted even a second, according to this embodiment, the dimensions and the forming number of these supply holes 46 and the receiving holes 45 are determined such that the supply holes 46 and the receiving holes 45 are always communicated with each other irrespective of the rotational position of the spindle 2. That is, as shown in FIG. 6(a), the cross-sectional area of the supply holes 46 is set larger than the cross-sectional area of the receiving holes 45. In this case, even when the receiving holes 45 do not face the supply holes 46 in an aligned manner, the supply holes 46 and the receiving holes 45 are communicated with each other. Further, as shown in FIG. 6(b), the number of the receiving holes 45 may be set larger than the number of the supply holes 46. In this case, even when some receiving holes 45 are completely closed, other receiving holes 45 are communicated with the supply holes 46.

The manner of operation of the spindle device having the above-mentioned constitution is explained hereinafter.

First of all, the pressurized lubrication fluid is supplied into the intake passage 12 formed in the housing 1 so as to give a low-speed rotation to the spindle 2. Thereafter, the pressurized drive fluid is supplied to the supply passage 13 also formed in the housing 1 and the turbine rotor 5 is rotatably driven by the drive fluid so as to give a rotation to the spindle 2.

Here, the gap inevitably exists between the fixed-side housing 1 and the rotary-side spindle 2. Accordingly, when a portion of the drive fluid leaks into the gap at the time of feeding the drive fluid into the drive fluid passage 24 of the spindle 2 from the housing 1, a whole quantity of the pressurized drive fluid fed into the supply passage 13 of the housing 1 under pressure is not used for driving the turbine rotor 5 and an output (rotational torque) of the turbine rotor 5 is decreased due to the loss of this drive fluid.

However, according to the spindle device of this embodiment, since the supply passage of the drive fluid is formed such that the supply passage passes through the radial dynamic pressure bearing constituted by the fixed sleeve 40 and the rotary sleeve 41, at the time of feeding the drive fluid into the fluid passage 24 of the spindle 2 from the housing 1, the loss can be suppressed to substantially zero and hence, the enhancement of an output of the turbine rotor 5 can be achieved. That is, the fixed sleeve 40 and the rotary sleeve 41 constitute the radial dynamic pressure bearing so that only an extremely thin bearing gap exists between the fixed sleeve 40 and the rotary sleeve 41 and a fluid lubrication film of a high pressure is formed in this bearing gap during the rotation of the spindle 2. Accordingly, the drive fluid blown off from the supply holes 46 of the fixed sleeve 40 hardly flows into the bearing gap of the radial dynamic pressure bearing so that an approximately whole quantity of the drive fluid flows into the receiving holes 45 of the rotary sleeve 41 formed at positions facing the supply holes 46 in an opposed manner. Accordingly, in the spindle device of this embodiment, an approximately whole quantity of the pressurized drive fluid fed under pressure into the supply passage 13 of the housing 1 can be fed into the drive fluid passage 24 of the rotating spindle 2 and this pressurized drive fluid can be directly used for the rotational drive of the turbine rotor 5.

Figure 7:
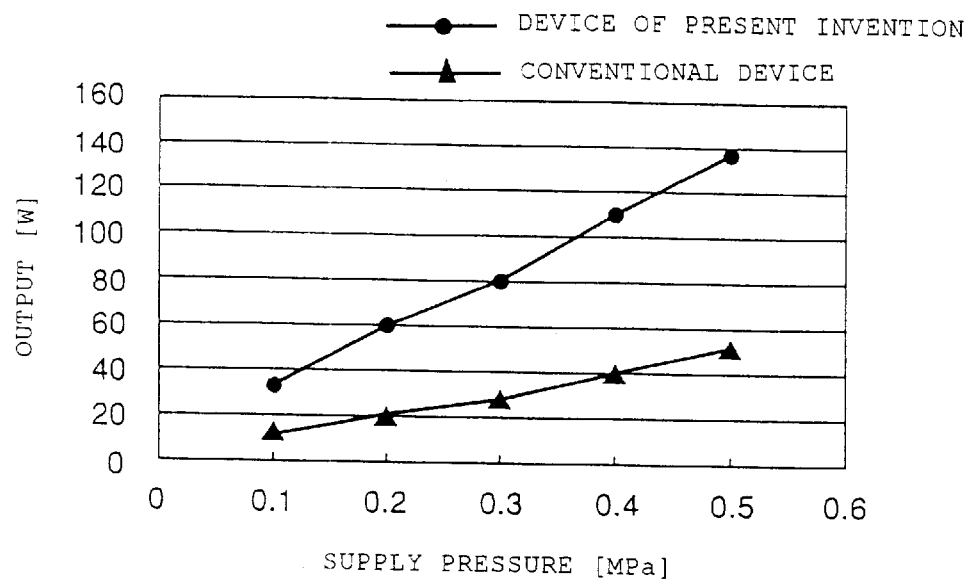
FIG. 7 is a graph showing a comparison result of an output of the spindle device according to the first embodiment and an output of a conventional spindle device.
Figure 8:
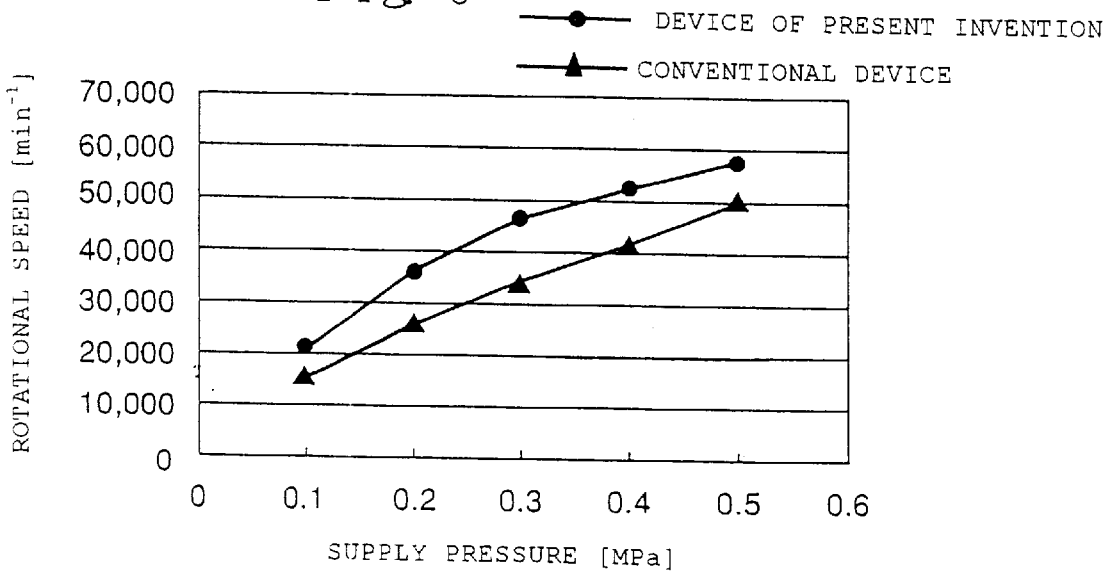
FIG. 8 is a graph showing a comparison result of a rotational speed of the spindle device according to the first embodiment and a rotational speed of a conventional spindle device.

FIG. 7 is a graph showing a result of a measurement carried out for measuring the change of the output of the spindle 2 to the supply pressure of the drive fluid with respect to both of the spindle device of the present invention and the conventional spindle device. FIG. 8 is a graph showing a result of a measurement carried out for measuring the change of the rotational speed of the spindle 2 to the change of supply pressure of the drive fluid. In both cases, the conventional device is a spindle device disclosed in Japanese Patent Laid-open No. 175137/1998. As can be understood from these measurement results, no substantial difference is observed between them with respect to the rotational speed of the spindle 2. However, it is understood that with respect to the output of the spindle 2, corresponding to the increase of the supply pressure of the drive fluid, the spindle device of the present invention exhibits the output larger than that of the conventional spindle device. That is, with respect to the conventional spindle device, it is considered that corresponding to the increase of the supply pressure of the drive fluid, a leaked quantity of the drive fluid between the housing 1 and the spindle 2 is increased and hence, the increase of the output of the spindle 2 is suppressed. To the contrary, with respect to the spindle device of the present invention, it is considered that since a leaked quantity of the drive fluid is little, the output of the spindle 2 is increased in proportion to the increase of the supply pressure.

Figure 9:
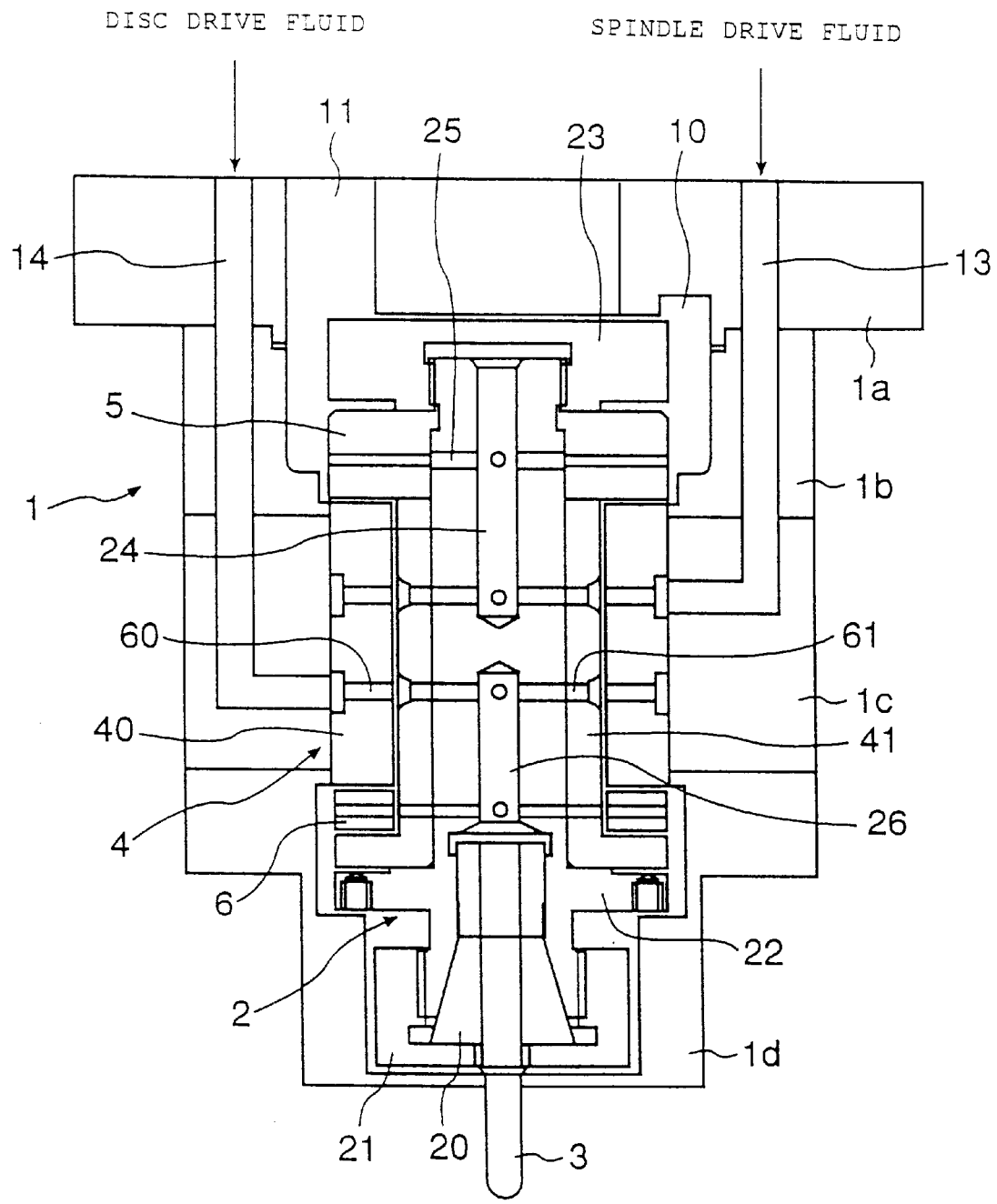
FIG. 9 is a cross-sectional view showing a spindle device of a second embodiment of the present invention.

Subsequently, a second embodiment of the spindle device to which the present invention is applied is shown in FIG. 9.

The structure of the spindle device of this second embodiment is basically approximately equal to that of the spindle device of the previously-mentioned first embodiment. However, in this spindle device, between the fixed sleeve 40 and a flange portion 41b of the rotary sleeve 41, a free disc 6 which is rotatable irrespective of the spindle 2 is disposed and the drive fluid is supplied to turbine blades formed on the free disc 6 through a supply system different from the supply system for the turbine rotor 5. Hereinafter, such a drive fluid is called "disc drive fluid". With respect to other constitution, the spindle device of this embodiment has the identical constitution as that of the first embodiment and hence, the same symbols are given to the constitutional components and the detailed explanation of other constitution is omitted.

A supply passage for the drive fluid to the turbine rotor 5 fixedly secured to the spindle 2 (hereinafter called "spindle drive fluid") is completely identical with that of the first embodiment. That is, the spindle drive fluid supplied under pressure to a supply passage 13 of a housing 1 is supplied into receiving holes 45 of a rotary sleeve 41 by way of supply holes 46 formed in a fixed sleeve 40 and then is blown to the turbine rotor 5 from radial blow-off holes 25 by way of a drive fluid passage 24 formed in the spindle 2. Further, a portion of the spindle drive fluid is supplied into a gap defined between the fixed sleeve 40 and the rotary sleeve 41 and is used also as a lubrication fluid of a radial dynamic pressure bearing and a thrust dynamic pressure bearing. Since the bearing gap of the radial dynamic pressure bearing is extremely small, a quantity of the spindle drive fluid which is not supplied to the receiving holes 45 of the rotary sleeve 41 and is used as the lubrication fluid is extremely small. Accordingly, even when the spindle drive fluid is also used as the lubrication fluid of the dynamic pressure bearing in common, a flow rate of the spindle drive fluid blown to the turbine rotor 5 is hardly decreased and there is no possibility that the output of the spindle 2 is extremely decreased compared with that of the first embodiment.

On the other hand, the free disc 6 is mounted on a journal portion 41a of the rotary sleeve 41 with a minute gap as a play therebetween and the free disc 6 and the journal portion 41 constitute the radial dynamic pressure bearing. Further, fine gaps are formed between one end surface of the free disc 6 and an end surface of the fixed sleeve 40 and between the other end surface of the free disc 6 and a flange portion 41b of the rotary sleeve 41. The fixed sleeve 40, the free disc 6 and the flange portion 41b constitute a pair of thrust dynamic pressure bearings. Although the dynamic pressure generating groove in a spiral shape is formed in the flange portion 41b of the rotary sleeve 41 in the previously-mentioned first embodiment, dynamic pressure generating grooves in a spiral shape are formed on front and rear surfaces of the free disc 6 in the second embodiment. When the free disc 6 is rotated in the state that the spindle 2 is stopped, fluid lubrication films of a high pressure are formed in the bearing gaps present in front of and behind the free disc 6. Further, when the spindle 2 is rotated in the state that the free disc 6 is stopped, the fluid lubrication film of a high pressure is formed only between the flange portion 41b of the rotary sleeve 41 and the free disc 6.

This free disc 6 is constituted such that it is provided with turbine blades equal to those of the turbine rotor 5 so that when disc drive fluid is blown to the free disc 6 from the inside to the outside in a radial direction, the free disc 6 can be freely rotated independently from the spindle 2. Although a supply passage of the disc drive fluid to the free disc 6 is completely separate and independent from a supply passage of the spindle drive fluid to the turbine rotor 5, the constitution of the supply passage per se of the disc drive fluid is similar to the constitutions of the supply passage of the spindle drive fluid. That is, the disc drive fluid supplied under pressure from a supply opening 14 of the housing 1 flows into receiving holes 61 of the rotary sleeve 41 by way of radial supply holes 60 formed in the fixed sleeve 40 and thereafter is blown to the free disc 6 by way of a drive fluid passage 26 formed along an axis of the spindle 2. Here, although the drive fluid passage 26 is opened to a distal end of the spindle 2, the drive fluid passage 26 is closed by a collet chuck 20 so that an approximately whole quantity of the drive fluid can be converted into the rotational energy.

According to the spindle device of the second embodiment having the above-mentioned constitution, while the spindle 2 can be rotated by supplying the spindle drive fluid to the turbine rotor 5 as a matter of course, by also supplying the disc drive fluid to the free disc 6, the free disc 6 can be rotated independently from the spindle 2. Here, by setting the rotary direction of the free disc 6 inverse to the rotary direction of the spindle 2, a large relative rotation difference is generated between the free disc 6 and the flange portion 41b of the rotary sleeve 41 so that a fluid lubrication film of a higher pressure is formed in the bearing gap of the thrust dynamic pressure bearing constituted by these components whereby the rigidity of the spindle 2 to a load in the axial direction can be increased.

Further, by supplying pressurized disc drive fluid to the free disc 6, the pressurized disc drive fluid flows into bearing gaps of the thrust dynamic pressure bearings which are positioned at both front and rear sides of the free disc 6. Accordingly, by rotating only the free disc 6 in advance at the time of starting the rotation of the spindle 2, even when the rotation of the spindle 2 is stopped, the fluid lubrication films of a high pressure are formed in the bearing gaps of the thrust dynamic pressure bearings so that the solid contact between the fixed sleeve 40 and the free disc 6 and the solid contact between the rotary sleeve 41 and the free disc 6 can be prevented whereby it becomes possible to smoothly start the rotation of the spindle 2. On the other hand, even when the supply of the spindle drive fluid to the turbine rotor 5 is stopped for stopping the rotation of the spindle 2, by rotating the free disc 6, the formation of the fluid lubrication films of a high pressure in the bearing gaps of the thrust dynamic pressure bearings can be maintained so that it becomes possible to smoothly stop the rotation of the spindle 2 while preventing the occurrence of the solid contact.

What is claimed is:

1. A spindle device comprising, a housing, a spindle rotatably supported on said housing, a rotary sleeve fixedly mounted on said spindle, a fixed sleeve mounted on said housing and facing said rotary sleeve in a given bearing gap, the fixed sleeve forming a radial dynamic pressure bearing together with said rotary sleeve, a turbine rotor fixedly mounted on said spindle so as to give a rotation to said spindle, the turbine rotor having a plurality of turbine blades, a drive fluid blown to said turbine blade of said turbine rotor in a radial direction toward a radial outside of said turbine rotor, a drive fluid passage formed along an axis of said spindle so as to send said drive fluid to said turbine rotor, supply holes formed in said fixed sleeve along a radial direction for supplying said drive fluid to said drive fluid passage of said spindle from a housing side, and receiving holes formed in said rotary sleeve along a radial direction and received said drive fluid from said supply holes for introducing said drive fluid into said drive fluid passage.

2. A spindle device according to claim 1, wherein a pair of dynamic pressure generating grooves are formed in an outer peripheral surface of said rotary sleeve or an inner peripheral surface of said fixed sleeve such that said dynamic pressure generating grooves sandwich said receiving holes and said supply holes.

3. A spindle device according to claim 1, wherein a plurality of supply holes and a plurality of receiving holes are respectively formed in said fixed sleeve and said rotary sleeve in the circumferential direction such that any one of said supply holes and any one of the receiving holes are always communicated with each other irrespective of a rotational position of said spindle.

4. A spindle device according to claim 1, wherein said rotary sleeve which constitutes said radial dynamic pressure bearing is provided with a flange portion and said flange portion faces an axial end surface of said fixed sleeve in an opposed manner by way of a given bearing gap thus constituting a thrust dynamic pressure bearing which restricts the movement of said spindle in the axial direction.

5. A spindle device according to claim 4, wherein a free disc which is rotatable relative to both of said housing and said spindle is disposed between said fixed sleeve and a flange portion of said rotary sleeve, and said free disc, said fixed sleeve and a thrust plate constitute a pair of thrust dynamic pressure bearings, and means for rotatably driving said free disc independently from said spindle is provided to said spindle device.

* * * * *